(12) United States Patent
Agarwal et al.

(10) Patent No.: US 11,546,738 B2
(45) Date of Patent: Jan. 3, 2023

(54) ALWAYS-ON SHORT MESSAGES

(71) Applicant: QUALCOMM Incorporated, San Diego, CA (US)

(72) Inventors: Ravi Agarwal, San Diego, CA (US); Gavin Bernard Horn, La Jolla, CA (US); Soo Bum Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/948,949

(22) Filed: Oct. 7, 2020

(65) Prior Publication Data

US 2021/0152982 A1    May 20, 2021

Related U.S. Application Data

(60) Provisional application No. 62/935,405, filed on Nov. 14, 2019.

(51) Int. Cl.
| | | |
|---|---|---|
| *H04W 4/14* | (2009.01) | |
| *H04W 4/06* | (2009.01) | |
| *H04W 72/12* | (2009.01) | |
| *H04W 68/02* | (2009.01) | |
| *H04W 12/106* | (2021.01) | |
| *H04W 12/121* | (2021.01) | |

(52) U.S. Cl.
CPC ............... *H04W 4/14* (2013.01); *H04W 4/06* (2013.01); *H04W 12/106* (2021.01); *H04W 12/121* (2021.01); *H04W 68/02* (2013.01); *H04W 72/12* (2013.01)

(58) Field of Classification Search
CPC ... H04W 4/14; H04W 12/106; H04W 12/121; H04W 4/06; H04W 72/12; H04W 68/02; H04W 76/50; H04W 68/005; H04W 4/90; H04W 48/20; H04W 52/0225; H04W 52/0229; Y02D 30/70
See application file for complete search history.

(56) References Cited

U.S. PATENT DOCUMENTS

| | | | |
|---|---|---|---|
| 2014/0066107 A1 | 3/2014 | Schmidt et al. | |
| 2014/0119334 A1* | 5/2014 | Kazmi | H04W 24/10 370/330 |
| 2015/0124728 A1* | 5/2015 | Bergstrom | H04L 5/001 370/329 |
| 2017/0238221 A1 | 8/2017 | Santhanam et al. | |
| 2019/0150114 A1 | 5/2019 | Liu et al. | |

(Continued)

OTHER PUBLICATIONS

International Search Report and Written Opinion—PCT/US2020/070630—ISA/EPO—dated Jan. 20, 2021.

*Primary Examiner* — Mazda Sabouri
(74) *Attorney, Agent, or Firm* — QUALCOMM Incorporated (57) ABSTRACT

Various aspects of the present disclosure generally relate to wireless communication. In some aspects, a user equipment (UE) may monitor a reception occasion for a short message that includes a system information change notification or a public warning system notification. The UE may initiate a mitigation action related to a radio link with a network based at least in part on non-reception by the UE of the short message in the reception occasion, failure of the short message to pass an integrity check, and/or the like. Numerous other aspects are provided.

30 Claims, 5 Drawing Sheets

(56) References Cited

U.S. PATENT DOCUMENTS

| | | |
|---|---|---|
| 2019/0289571 A1 | 9/2019 | Park et al. |
| 2019/0313365 A1 | 10/2019 | Islam et al. |
| 2020/0084698 A1* | 3/2020 | Rune ............... H04W 48/08 |
| 2020/0322918 A1* | 10/2020 | Shih ............... H04W 68/02 |

* cited by examiner

ALWAYS-ON SHORT MESSAGES

CROSS-REFERENCE TO RELATED APPLICATION

This Patent Application claims priority to U.S. Provisional Patent Application No. 62/935,405, filed on Nov. 14, 2019, entitled "ALWAYS-ON SHORT MESSAGES," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for always-on short messages.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies and the telecommunication standards that employ these technologies remain useful.

SUMMARY

In some aspects, a method of wireless communication, performed by a user equipment (UE), may include: monitoring a reception occasion for a short message that includes a system information change notification or a public warning system notification; and initiating a mitigation action related to a radio link with a network based at least in part on non-reception by the UE of the short message in the reception occasion.

In some aspects, a method of wireless communication, performed by a base station, may include: scheduling a short message to be transmitted in a reception occasion; and transmitting the short message in the reception occasion, wherein the short message includes information to indicate whether there is an upcoming system information change notification or an upcoming public warning system notification to be used by a UE to assess a status of a radio link with the base station.

In some aspects, a UE for wireless communication may include a memory and one or more processors operatively coupled to the memory. The memory and the one or more processors may be configured to: monitor a reception occasion for a short message that includes a system information change notification or a public warning system notification; and initiate a mitigation action related to a radio link with a network based at least in part on non-reception by the UE of the short message in the reception occasion.

In some aspects, a base station for wireless communication may include a memory and one or more processors operatively coupled to the memory. The memory and the one or more processors may be configured to: schedule a short message to be transmitted in a reception occasion; and transmit the short message in the reception occasion, wherein the short message includes information to indicate whether there is an upcoming system information change notification or an upcoming public warning system notification to be used by a user equipment to assess a status of a radio link with the base station.

In some aspects, a non-transitory computer-readable medium may store one or more instructions for wireless communication. The one or more instructions, when executed by one or more processors of a UE, may cause the one or more processors to: monitor a reception occasion for a short message that includes a system information change notification or a public warning system notification; and initiate a mitigation action related to a radio link with a network based at least in part on non-reception by the UE of the short message in the reception occasion.

In some aspects, a non-transitory computer-readable medium may store one or more instructions for wireless communication. The one or more instructions, when executed by one or more processors of a base station, may cause the one or more processors to: schedule a short message to be transmitted in a reception occasion; and transmit the short message in the reception occasion, wherein the short message includes information to indicate whether there is an upcoming system information change notification or an upcoming public warning system notification to be used by a user equipment to assess a status of a radio link with the base station.

In some aspects, an apparatus for wireless communication may include: means for monitoring a reception occasion for a short message that includes a system information change notification or a public warning system notification; and means for initiating a mitigation action related to a radio link with a network based at least in part on non-reception by the apparatus of the short message in the reception occasion.

In some aspects, an apparatus for wireless communication may include means for scheduling a short message to be transmitted in a reception occasion; and means for transmitting the short message in the reception occasion, wherein the short message includes information to indicate whether there is an upcoming system information change notification or an upcoming public warning system notification to be used by a user equipment to assess a status of a radio link with the base station.

Aspects generally include a method, apparatus, system, computer program product, non-transitory computer-readable medium, UE, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
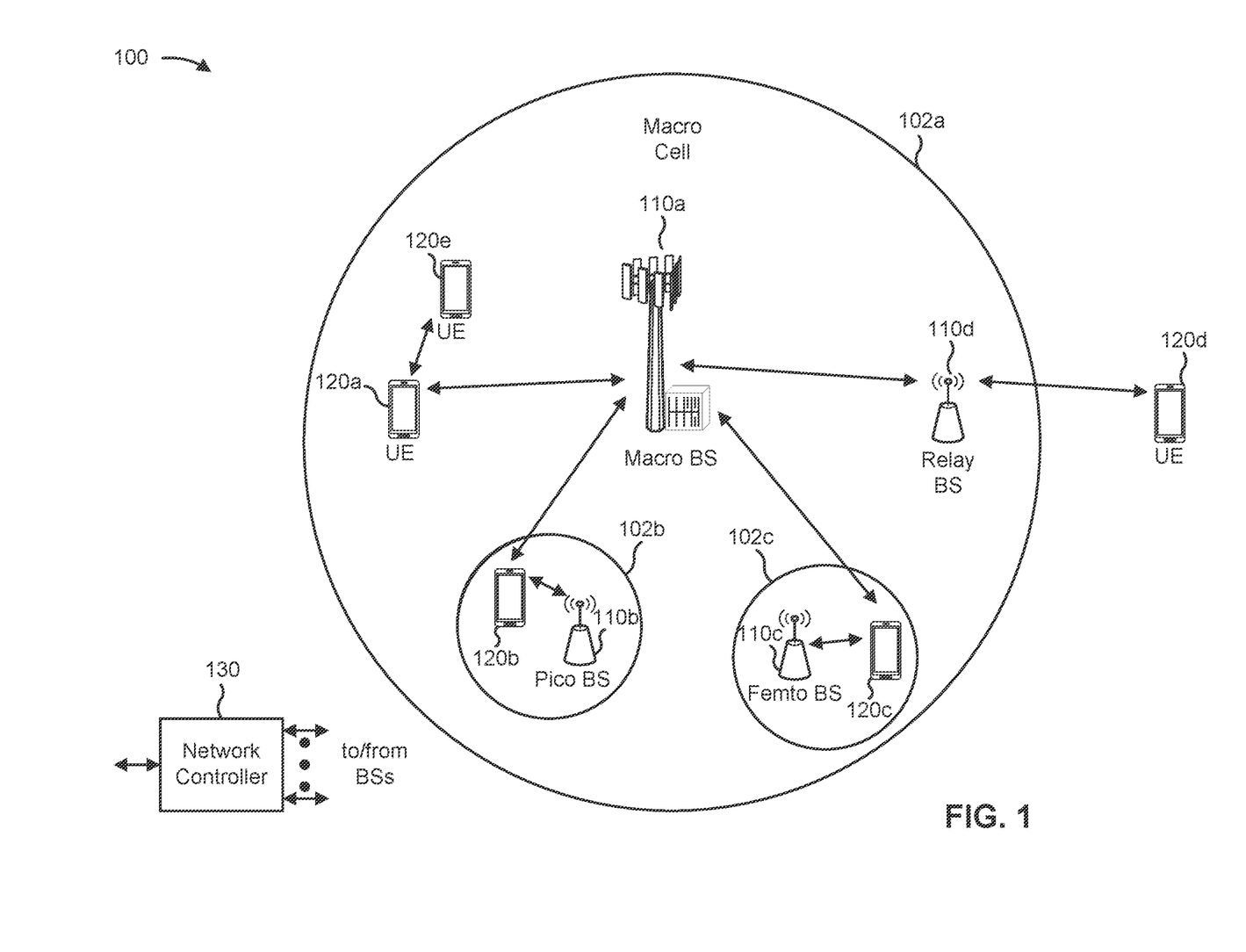
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device (a smart watch, smart clothing, smart glasses, a smart wrist band, smart jewelry (e.g., a smart ring, a smart bracelet)), an entertainment device (e.g., a music or video device, or a satellite radio), a vehicular component or sensor, a smart meter/sensor, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
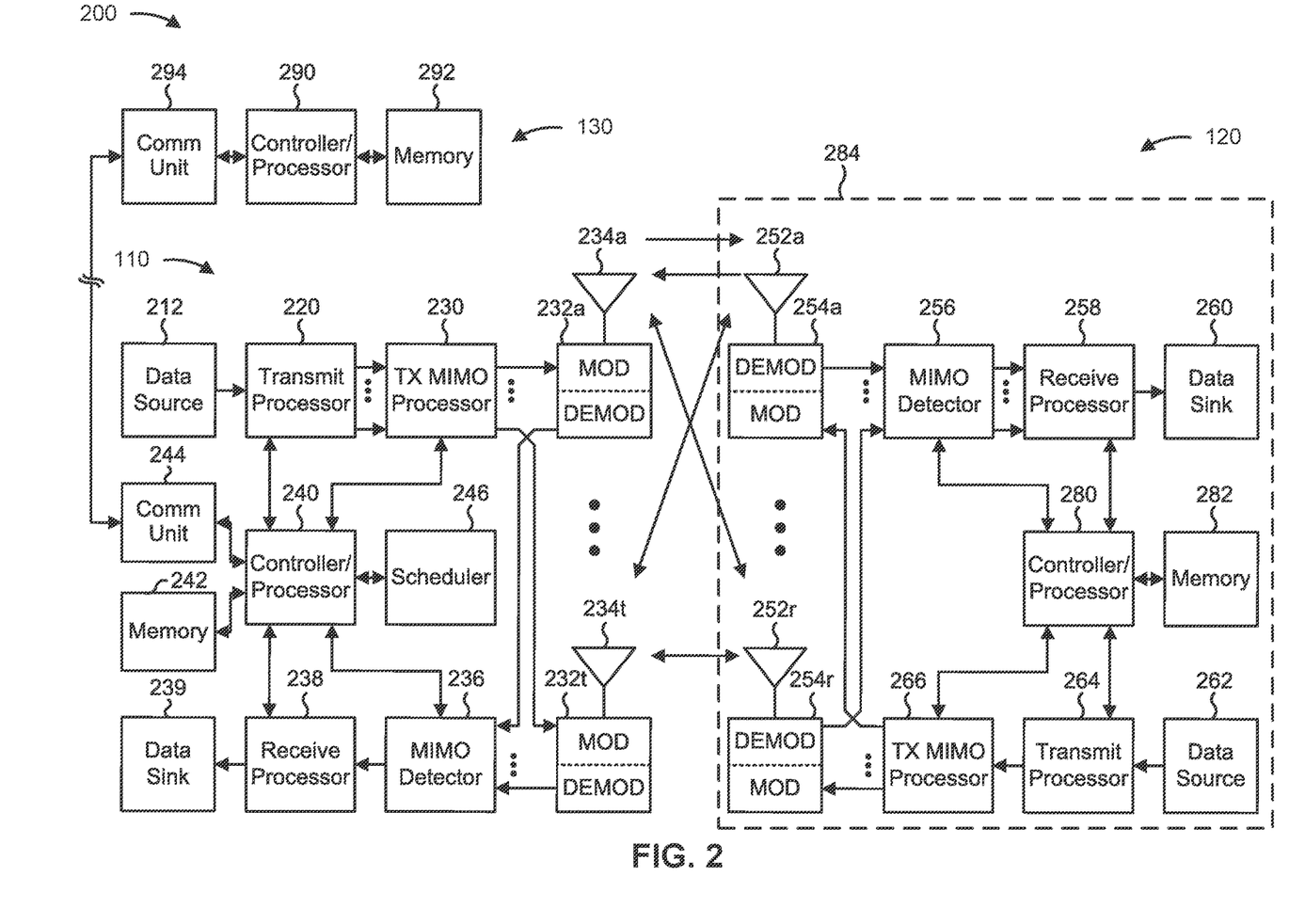
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with always-on short messages, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, interpreting the instructions, and/or the like.

In some aspects, UE 120 may include means for monitoring a reception occasion for a short message that includes a system information change notification or a public warning system notification, means for initiating a mitigation action related to a radio link with a network based at least in part on non-reception by UE 120 of the short message in the reception occasion, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for scheduling a short message to be transmitted in a reception occasion, means for transmitting the short message in the reception occasion, where the short message includes information to indicate whether there is an upcoming system information change notification or an upcoming public warning system notification to be used by UE 120 to assess a status of a radio link with base station 110, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In a wireless network, such as an NR network and/or the like, a short message (sometimes referred to as a short paging message and/or the like) may be configured to carry information related to a system information change notification, a public warning system (PWS) notification, and/or the like. In general, a short message is transmitted by a base station on a downlink control channel (e.g., a physical downlink control channel (PDCCH)), and the short message may be addressed to a common identifier (e.g., a paging radio network temporary identifier (P-RNTI)) associated with a group that includes all UEs operating in a cell associated with the base station. Accordingly, when a UE is in an idle or inactive state, the UE may monitor the downlink control channel for a short message that includes a system information change notification and/or a PWS notification during a specific paging occasion assigned to the UE in each discontinuous reception (DRx) cycle. Furthermore, when a UE is in a connected state, the UE may monitor the downlink control channel for a short message that includes a system information change notification in any paging occasion at least once per system information change modification period, and may monitor the downlink control channel for a short message that includes a PWS notification in any paging occasion at least once per default paging cycle.

In general, a base station may transmit a short message to inform all of the UEs that are operating in the cell associated with the base station that there is an upcoming system information change and/or an upcoming PWS message. Additionally, or alternatively, the base station may transmit a short message to indicate that there is not an upcoming system information change and/or an upcoming PWS message. In some cases, in order to reduce signaling overhead, conserve base station resources, and/or the like, a base station may be configured to transmit a short message only when there is an actual upcoming system information change or an upcoming PWS message (e.g., the base station may skip a short message transmission in cases where there is no upcoming system information change or an upcoming PWS message). However, an unauthorized device (e.g., a false base station (FBS)) can potentially exploit this behavior to perform a denial of service attack against one or more UEs.

More particularly, in order to initiate an attack against a UE, an FBS may initially transmit one or more synchronization signals to the UE in an effort to cause the UE to synchronize to the FBS (rather than a legitimate base station). Once the UE is camped on or otherwise connected to the FBS, the FBS may launch various attacks against the UE. For example, in some cases, the FBS may perform a man-in-the-middle attack, whereby the FBS acts as a malicious repeater to secretly relay and possibly alter or drop communications between the UE and the legitimate base station. For example, the FBS may receive transmissions from the legitimate base station, which may include important short messages to indicate that a system information change is upcoming, a PWS message is upcoming (e.g., to inform a user about an earthquake or tsunami), and/or the like, and the FBS may modify, inject, and/or selectively drop transmissions that are intended for the UE. The risk of these attacks may be especially acute on physical layer channels, such as the PDCCH or other downlink control channel used to carry short messages, which are typically not secured through ciphering, integrity protection, and/or the like.

Accordingly, to perform a denial of service attack that targets short message behavior, an FBS or other unauthorized device acting as a malicious repeater may selectively drop all downlink transmissions that carry a short message from the legitimate base station. Consequently, any UE camped on or otherwise synchronized to the FBS would not receive any short messages that indicate when there is an upcoming system information change, an upcoming PWS message, and/or the like, and the UE may interpret the absence of the short messages as an implicit indicator that there is no upcoming system information change and/or PWS message. This may pose a significant security threat in wireless networks, as the resulting denial of service (e.g., non-reception of the short message) may lead to lost connectivity when the UE fails to decode a short message indicating that there is an upcoming system information change, safety risks when the UE fails to receive a PWS message related to an earthquake, tsunami, hurricane, child abduction, and/or the like.

Some aspects described herein relate to techniques and apparatuses to provide an always-on short message configuration. For example, in some aspects, a UE operating in an idle or inactive state may expect to receive at least one short message that carries a system information change notification, a PWS notification, and/or the like in each paging cycle. Furthermore, a UE operating in a connected state may expect to receive a short message that includes a system information change notification in each system information change modification period and may expect to receive a short message that includes a PWS notification every default paging cycle. Accordingly, in some aspects, a base station may be configured to transmit short messages according to an expected periodicity, and the short messages may generally indicate whether there is an actual upcoming system information change or an actual upcoming PWS message. In other words, the base station may transmit a short message according to the expected periodicity (e.g., at least once per system information change modification period, default paging cycle, and/or the like) even in cases when the short message indicates that there is not an upcoming system information change or an upcoming PWS message. In this way, if a UE does not receive a short message within the expected period, the UE may initiate one or more mitigation actions for a radio link based at least in part on non-reception of the short message within the expected period. For example, in some aspects, the non-reception of the short message within the expected period may indicate that poor network conditions that are interfering with reception of the short message, malicious behavior by an FBS, and/or the like. Accordingly, in cases where the UE does not receive a short message in one or more periods when a short message is expected, the UE may initiate a mitigation action such as changing one or more communication parameters used to connect to the wireless network, reporting the potential presence of an FBS to a security server, and/or the like.

Figure 3:
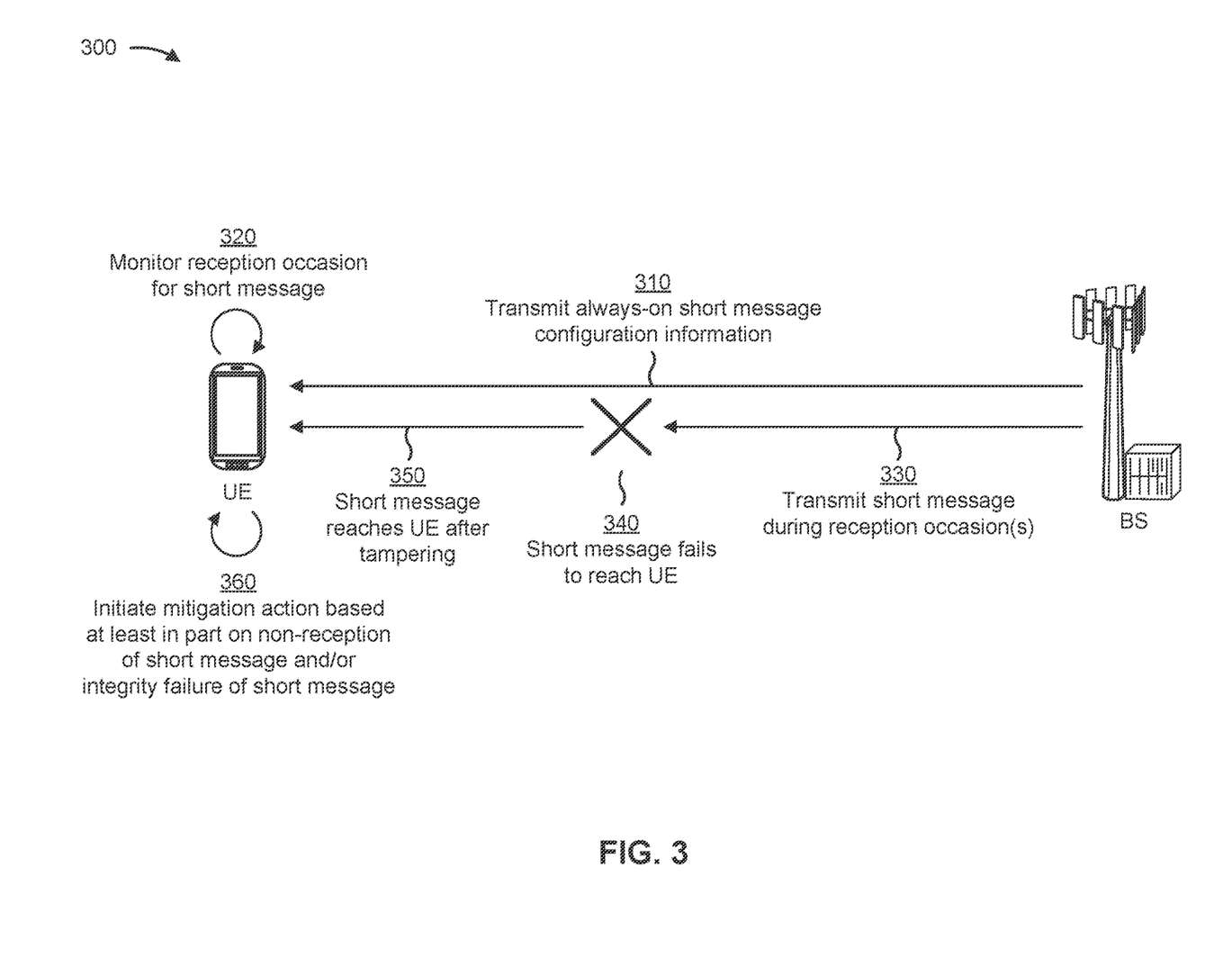
FIG. 3 is a diagram illustrating an example of always-on short messages, in accordance with various aspects of the present disclosure.

FIG. 3 is a diagram illustrating an example 300 of always-on short messages, in accordance with various aspects of the present disclosure. As shown in FIG. 3, example 300 includes a UE in communication with a base station over a radio link. In some aspects, the base station shown in FIG. 3 may be a legitimate base station associated with a wireless network, and the UE and the base station may communicate according to an always-on short message configuration to ensure that the UE is able to initiate appropriate mitigation action(s) in cases where poor network conditions, the presence of an unauthorized device (e.g., a false base station (FBS)), and/or the like may prevent the UE from receiving short messages that carry important information related to system information changes, public warnings, and/or the like.

As shown in FIG. 3, and by reference number 310, the base station may transmit, and the UE may receive, always-on short message configuration information. For example, in some aspects, the always-on short message configuration information may include radio resource control (RRC) signaling, downlink control information (DCI), a medium access control (MAC) control element (MAC-CE), and/or other suitable information to indicate that the base station is configured to transmit at least one short message according to a configured periodicity (e.g., based on a latency requirement associated with the short message), even in cases where the short message indicates that there is no upcoming system information change, no upcoming PWS message, and/or the like. Additionally, or alternatively, in some aspects, short messages may have a default always-on configuration. In some aspects, in addition to indicating the periodicity for short messages, the always-on configuration information may include information related to one or more security keys to be used to verify integrity of a short message (e.g., based on a symmetric and/or asymmetric key exchange). In this way, the UE may use the one or more security keys to decipher or otherwise verify that received short messages were transmitted by the base station and not by a FBS that tampered with the short message, transmitted an illegitimate short message, and/or the like.

Furthermore, in some aspects, the always-on short message configuration information may include one or more parameters to enable the UE to monitor a downlink control channel for the short message(s) and to decode short messages that are transmitted to the UE via the downlink control channel. For example, in some aspects, the always-on configuration information may include a common identifier (e.g., a P-RNTI) associated with each UE operating in a cell associated with the base station, and each short message transmitted by the base station may be addressed to the common identifier. Accordingly, as described herein, the UE may monitor the downlink control channel for one or more messages addressed to the common identifier in order to detect the short message(s). Furthermore, in some aspects, the always-on configuration information may indicate a specific paging occasion assigned to the UE, a system information change modification period, a default paging cycle, and/or the like.

For example, the specific paging occasion may be assigned to the UE to enable the UE to monitor for the short messages while the UE is operating in an idle or inactive state, and the system information change modification period and the default paging cycle may be indicated to the UE to enable the UE to select an occasion in which to monitor for the short messages while the UE is operating in a connected state. For example, in some aspects, the UE may monitor for a short message that includes a system information change notification and/or a PWS notification during the specific paging occasion assigned to the UE in each discontinuous reception (DRx) cycle while the UE is operating in the idle or inactive state. Furthermore, when the UE is operating in the connected state, the UE may monitor for a short message that includes a system information change notification in any available paging occasion at least once per system information change modification period and may monitor for a short message that includes a PWS notification in any available paging occasion at least once per default paging cycle.

In some aspects, the always-on configuration information may include one or more parameters to reduce signaling overhead associated with the always-on configuration. For example, in some aspects, the base station may assign a short message reception occasion to each UE synchronized to the base station, and the short message reception occasion may be related to or independent from the specific paging occasion assigned to the UE. In this way, the base station may schedule a single short message to address all UEs that are assigned the same short message reception occasion to reduce signaling overhead. Additionally, or alternatively, the always-on configuration information may include information to indicate a set of multiple reception occasions that are allocated to short messages and information to indicate that the UE is permitted to select one of the multiple reception occasions that is closest in time to the specific paging occasion assigned to the UE when the UE is operating in the idle or inactive state, which conserves resources of the UE by reducing wake up overhead, power consumption, and/or the like (e.g., by waking once to monitor the downlink control channel during the specific paging occasion assigned to the UE and the short message reception occasion that is closest in time to the specific paging occasion assigned to the UE). Accordingly, by configuring a short message reception occasion for the UE and/or allowing the UE to select one of the multiple reception occasions that is closest in time to the specific paging occasion assigned to the UE, the UE may have to perform at most one additional wake up outside the specific paging occasion assigned to the UE. Furthermore, the always-on short message configuration information may indicate that the UE is permitted to select any one of the multiple reception occasions that are allocated to short messages as the reception occasion to be monitored while in the connected state.

As further shown in FIG. 3, and by reference number 320, the UE may monitor a reception occasion for the short message from the base station according to the configured periodicity. For example, in some aspects, the UE may determine the reception occasion to be monitored based at least in part on the always-on configuration information received from the base station and a current connection status associated with the UE. For example, when the UE is operating in an idle or inactive state, the UE may periodically wake up during a DRx cycle to monitor the downlink control channel for a short message addressed to the common identifier (e.g., the P-RNTI) associated with all UEs in the cell associated with the base station in the specific paging occasion assigned to the UE. Additionally, or alternatively, the UE may select, among the multiple short message reception occasions configured by the base station, a particular short message reception occasion that is closest in time to the specific paging occasion assigned to the UE. Additionally, or alternatively, when operating in a connected state, the UE may monitor for a short message that includes a system information change notification in any one or more paging occasions in a system information change modification period and may monitor for a short message that includes a PWS notification in any one or more paging occasions within a default paging cycle. Additionally, or alternatively, in cases where multiple short message reception occasions are configured by the base station, the UE may monitor any one or more of the short message reception occasions when the UE is operating in the connected state.

As further shown in FIG. 3, and by reference number 330, the base station may transmit a short message to the UE on the downlink control channel during one or more reception occasions that are configured for the UE according to the configured periodicity. For example, in some aspects, the reception occasion(s) in which the base station transmits the short message may correspond to the specific paging occasion assigned to the UE (e.g., for cases in which the UE is operating in the idle or inactive state) and/or a paging occasion that is assigned to one or more other UEs (e.g., for cases in which the UE is operating in the connected state and is permitted to monitor any paging occasion). Additionally, or alternatively, the reception occasion(s) in which the base station transmits the short message may include one or more short message reception occasions, which may be related to and/or independent from the paging occasions. In some aspects, as described above, the short message may indicate that there is an upcoming system information change, an upcoming PWS message, and/or the like. Additionally, or alternatively, in some aspects, the short message may indicate there is no upcoming system information change and/or an upcoming PWS message. Accordingly, the base station may generally be configured to always transmit the short message based at least in part on the configured periodicity, even in cases where there is no need to schedule a subsequent system information change and/or PWS message.

As further shown in FIG. 3, and by reference number 340, the short message may fail to reach the UE. For example, in some aspects, there may be poor network conditions (e.g., attenuation, path loss, and/or the like due to obstacles, interference, and/or the like) that result in the short message failing to reach the UE. Additionally, or alternatively, an FBS acting as a malicious repeater between the UE and the base station may receive the short message and selectively drop the short message. Accordingly, there may be various conditions that result in the short message failing to reach the UE, which may generally indicate that there is a problem with a radio link between the UE and the base station since the UE expects to receive at least one short message according to the configured periodicity. Additionally, or alternatively, as shown by reference number 350, the short message may reach the UE after the short message has been subjected to tampering. For example, rather than dropping the FBS, which may indicate the potential presence of the FBS between the UE and the base station, the FBS may modify the contents of the short message and/or transmit an illegitimate short message to the UE to mimic the always-on behavior of the legitimate base station.

As further shown in FIG. 3, and by reference number 360, the UE may initiate one or more mitigation actions based at least in part on non-reception of the short message during the monitored reception occasion and/or failure of the short message to pass an integrity verification. For example, in cases where the UE receives the short message, the short message may be cryptographically secured to prevent tampering and the UE may use the one or more security keys previously configured by the base station to verify the integrity of the short message (e.g., using a public key paired with a private key used by the base station to digitally sign the short message, using a shared secret established between the UE and the base station, such as in a Diffie-Hellman key exchange, and/or the like). Accordingly, in cases where the UE receives the short message during the monitored reception occasion and is able to verify that the short message is a legitimate short message from the base station, the UE may decode and appropriately process the short message. For example, no further action may be taken to process the short message where the short message indicates that there is no upcoming system information change or PWS message. Alternatively, when the short message indicates that there is an upcoming system information change or PWS message, the UE may schedule reception of the upcoming system information change or PWS message. Accordingly, in some aspects, the UE may generally apply normal behavior to decode and process short messages that are received during expected reception occasions and pass the applicable integrity verification measures.

However, in cases where the UE fails to receive a short message during a monitored reception occasion and/or receives a short message that fails to pass the applicable integrity verification measures, the UE may initiate one or more mitigation actions. For example, the non-reception of the short message and/or failure of the short message to pass integrity verification may indicate one or more problems with the radio link between the UE and the base station, which may include poor network conditions, the potential presence of an unauthorized device (e.g., an FBS), and/or the like. Furthermore, in some aspects, the mitigation action (s) may be initiated by the UE and/or the base station only after a short message is not received in a threshold quantity of reception occasions and/or a threshold quantity of short messages that fail the integrity check are received. In this way, the UE may avoid incurring the overhead of the mitigation action(s) in cases where non-reception of a short message and/or failure of a short message to pass the integrity check is an anomalous event. For example, if the UE does not receive a short message in a first reception occasion and then receives a verified short message in the next reception occasion, the non-reception of the short message in the first reception occasion may be attributable to a temporary signal blockage rather than the presence of an unauthorized device or consistently degraded network conditions that may merit mitigation action(s).

Accordingly, in some aspects, the mitigation action(s) initiated by the UE may include reporting the non-reception of the short message and/or failure of the short message to pass integrity verification to a security server to indicate the potential presence of an unauthorized device. Additionally, or alternatively, in some aspects, the mitigation action(s) may include changing one or more communication parameters to access the wireless network using a different cell, a different frequency, a different band, a different radio access technology, and/or the like. Additionally, or alternatively, the mitigation action(s) may include transmitting a report to the base station to indicate the non-reception of the short message and/or failure of the short message to pass integrity verification, and the base station may assist the UE in performing the mitigation action(s) by causing the UE to be handed over to a different cell, a different frequency, and/or the like, by changing one or more communication parameters associated with the UE to cause the UE to deprioritize cell selection or cell reselection for a cell associated with non-reception of a short message and/or reception of a short message that failed an integrity check. In this way, repeated non-reception of the short message and/or repeated failure of the short message to pass integrity verification may be used to detect network conditions and/or suspicious behavior and to allow the UE to adjust communication parameters to improve link quality, avoid an attack, ensure that system information changes and/or PWS messages are received, and/or the like.

As indicated above, FIG. 3 is provided as an example. Other examples may differ from what is described with respect to FIG. 3.

Figure 4:
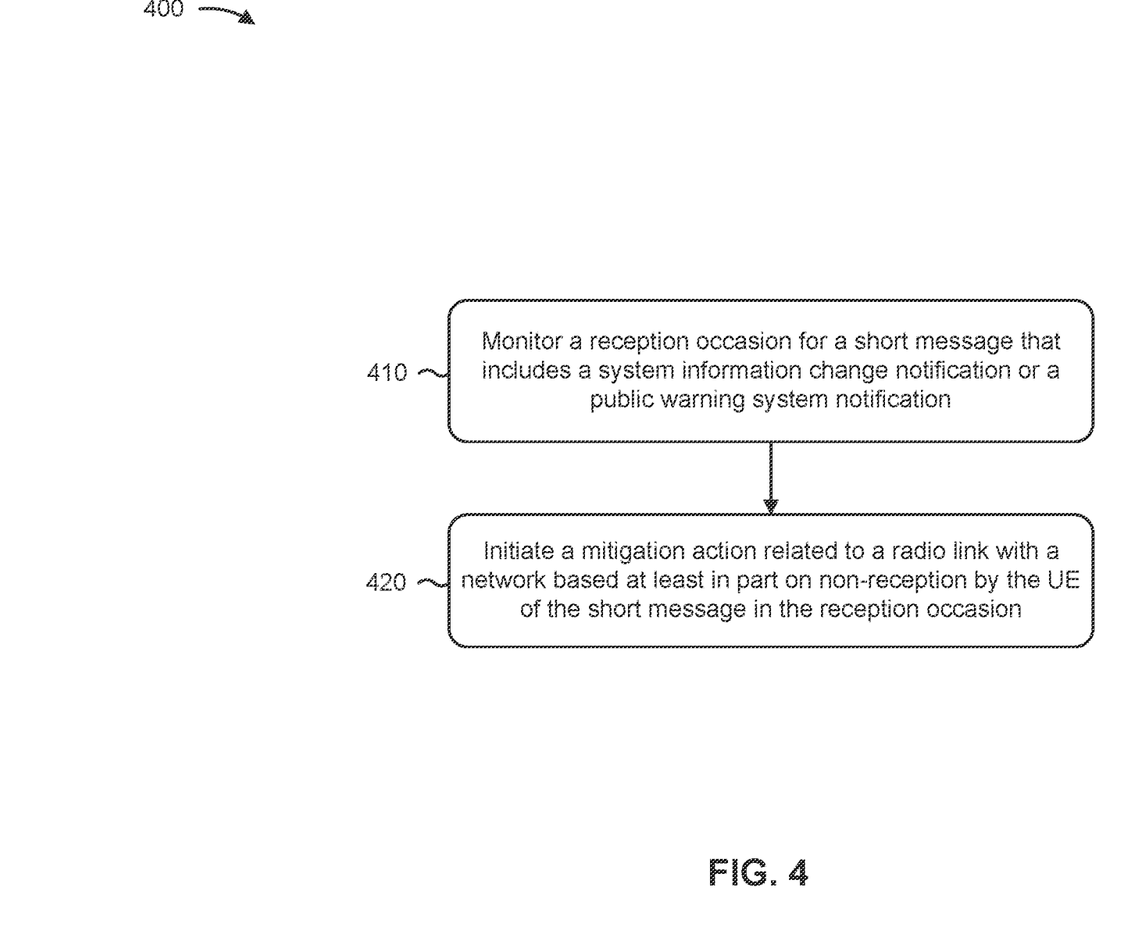
FIG. 4 is a diagram illustrating an example process performed, for example, by a UE, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120 and/or the like) performs operations associated with always-on short messages.

As shown in FIG. 4, in some aspects, process 400 may include monitoring a reception occasion for a short message that includes a system information change notification or a public warning system notification (block 410). For example, the UE may monitor (e.g., using antenna 252, DEMOD 254, MIMO detector 256, receive processor 258, controller/processor 280, and/or the like) a reception occasion for a short message that includes a system information change notification or a public warning system notification, as described above.

As further shown in FIG. 4, in some aspects, process 400 may include initiating a mitigation action related to a radio link with a network based at least in part on non-reception by the UE of the short message in the reception occasion (block 420). For example, the UE may initiate (e.g., using antenna 252, DEMOD 254, MIMO detector 256, receive processor 258, controller/processor 280, transmit processor 264, TX MIMO processor 266, MOD 254, antenna 252, and/or the like) a mitigation action related to a radio link with a network based at least in part on non-reception by the UE of the short message in the reception occasion, as described above.

Process 400 may include additional aspects, such as any single aspect or any combination of aspects described below and/or in connection with one or more other processes described elsewhere herein.

In a first aspect, the non-reception of the short message in the reception occasion indicates one or more of poor performance for the radio link or a presence of an unauthorized device on the radio link.

In a second aspect, alone or in combination with the first aspect, the mitigation action includes reporting the non-reception of the short message to one or more servers on the network.

In a third aspect, alone or in combination with one or more of the first and second aspects, the mitigation action includes modifying one or more communication parameters to access the network using a different cell, a different frequency, a different band, or a different radio access technology.

In a fourth aspect, alone or in combination with one or more of the first through third aspects, the short message is scheduled to be transmitted to a group that includes multiple UEs in the reception occasion.

In a fifth aspect, alone or in combination with one or more of the first through fourth aspects, process 400 may further include receiving, from the network, information indicating a periodicity associated with the reception occasion, and the reception occasion is monitored for the short message according to the periodicity while the UE is in an idle or inactive state.

In a sixth aspect, alone or in combination with one or more of the first through fifth aspects, process 400 may further include identifying the reception occasion to be monitored for the short message while in an idle or inactive state based at least in part on an identity associated with the UE.

In a seventh aspect, alone or in combination with one or more of the first through sixth aspects, process 400 may further include receiving, from the network, information identifying multiple reception occasions in which the short message is scheduled to be transmitted and selecting one of the multiple reception occasions that is closest in time to a paging occasion associated with the UE as the reception occasion to be monitored for the short message while the UE is in an idle or inactive state.

In an eighth aspect, alone or in combination with one or more of the first through seventh aspects, process 400 may further include receiving, from the network, information identifying multiple reception occasions in which the short message is scheduled to be transmitted and selecting any one of the multiple reception occasions as the reception occasion to be monitored for the short message while the UE is in a connected state.

In a ninth aspect, alone or in combination with one or more of the first through eighth aspects, process 400 may further include receiving the short message during the monitored reception occasion and performing an integrity check on the received short message using one or more security keys, where the mitigation action is initiated based at least in part on the short message failing to pass the integrity check.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
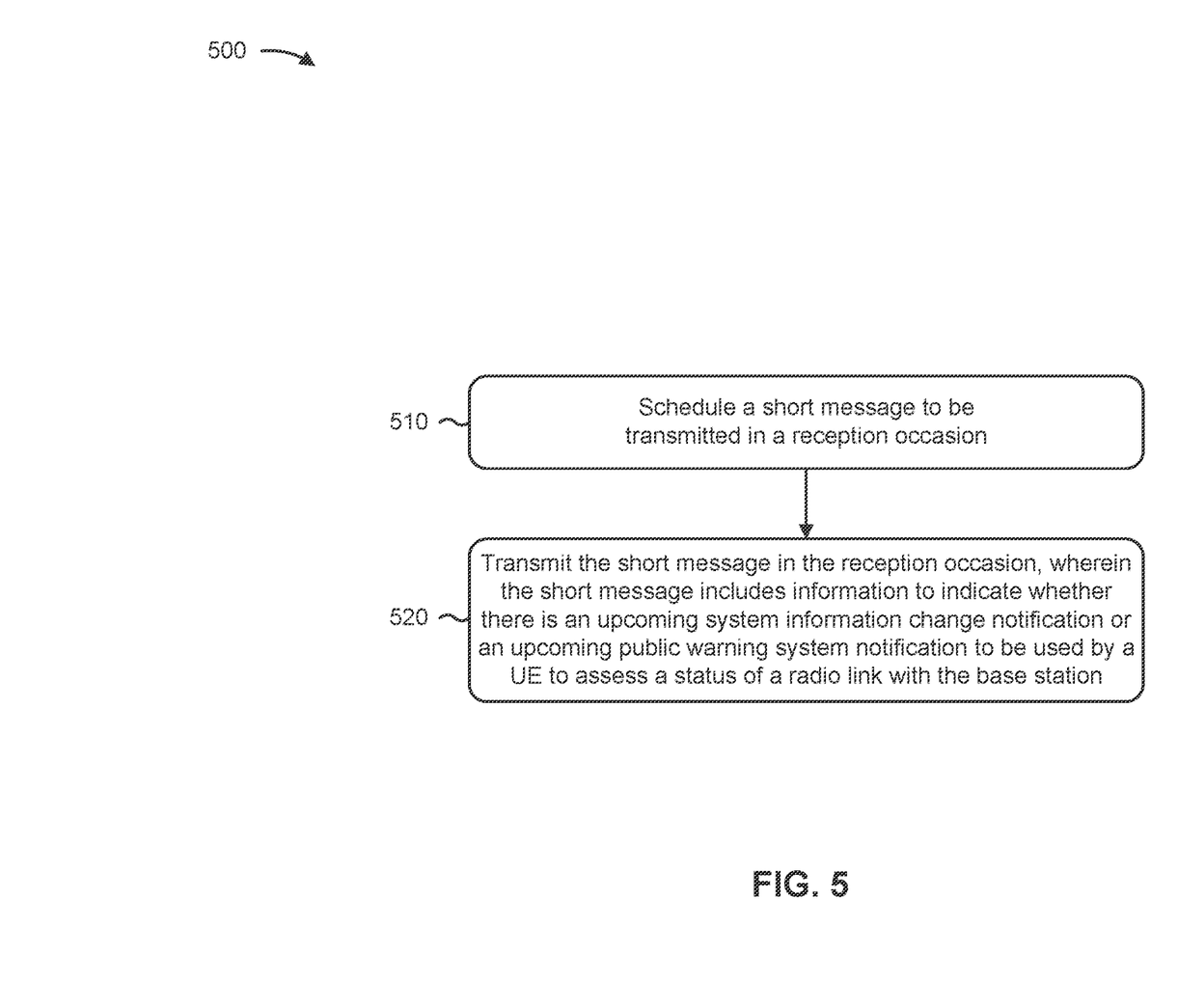
FIG. 5 is a diagram illustrating an example process performed, for example, by a base station, in accordance with various aspects of the present disclosure.

FIG. 5 is a diagram illustrating an example process 500 performed, for example, by a base station, in accordance with various aspects of the present disclosure. Example process 500 is an example where a base station (e.g., base station 110 and/or the like) performs operations associated with always-on short messages.

As shown in FIG. 5, in some aspects, process 500 may include scheduling a short message to be transmitted in a reception occasion (block 510). For example, the base station may schedule (e.g., using controller/processor 240 and/or the like) a short message to be transmitted in a reception occasion, as described above.

As further shown in FIG. 5, in some aspects, process 500 may include transmitting the short message in the reception occasion, wherein the short message includes information to indicate whether there is an upcoming system information change notification or an upcoming public warning system notification to be used by a UE to assess a status of a radio link with the base station (block 520). For example, the base station may transmit (e.g., using controller/processor 240, transmit processor 220, TX MIMO processor 230, MOD 232, antenna 234, and/or the like) the short message in the reception occasion, as described above. In some aspects, the short message includes information to indicate whether there is an upcoming system information change notification or an upcoming public warning system notification to be used by a UE to assess a status of a radio link with the base station.

Process 500 may include additional aspects, such as any single aspect or any combination of aspects described below and/or in connection with one or more other processes described elsewhere herein.

In a first aspect, non-reception of the short message by the UE indicates one or more of poor performance for the radio link or a presence of an unauthorized device on the radio link.

In a second aspect, alone or in combination with the first aspect, the short message is scheduled to be transmitted to a group that includes multiple UEs in the reception occasion.

In a third aspect, alone or in combination with one or more of the first and second aspects, process 500 may further include determining a periodicity associated with the reception occasion based at least in part on a latency requirement associated with the short message and transmitting, to the UE, information indicating the periodicity associated with the reception occasion to be monitored while the UE is in an idle or inactive state.

In a fourth aspect, alone or in combination with one or more of the first through third aspects, process 500 may further include identifying the reception occasion in which to schedule the short message based at least in part on an identity associated with the UE while in an idle or inactive state.

In a fifth aspect, alone or in combination with one or more of the first through fourth aspects, process 500 may further include transmitting, to the UE, information identifying multiple reception occasions in which the short message is scheduled to be transmitted and transmitting, to the UE, information permitting the UE to select one of the multiple reception occasions that is closest in time to a paging occasion associated with the UE as the reception occasion to be monitored for the short message while the UE is in an idle or inactive state.

In a sixth aspect, alone or in combination with one or more of the first through fifth aspects, process 500 may further include transmitting, to the UE, information identifying multiple reception occasions in which the short message is scheduled to be transmitted and transmitting, to the UE, information permitting the UE to select any one of the multiple reception occasions as the reception occasion to be monitored for the short message while the UE is in a connected state.

In a seventh aspect, alone or in combination with one or more of the first through sixth aspects, process 500 may further include receiving, from the UE, a report indicating one or more of non-reception of the short message in the reception occasion or failure of the short message to pass an integrity check and initiating a mitigation action related to the radio link based at least in part on the report.

In an eighth aspect, alone or in combination with one or more of the first through seventh aspects, the mitigation action includes causing the UE to be handed over to one or more of a different cell, a different frequency, a different band, or a different radio access technology.

In a ninth aspect, alone or in combination with one or more of the first through eighth aspects, the mitigation action includes changing one or more communication parameters to cause the UE to deprioritize selection or reselection of a cell used to transmit the short message.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   monitoring a reception occasion for a short message that includes a system information change notification or a public warning system notification,
      wherein the system information change notification indicates an upcoming system information change or that there is no upcoming system information change, and
      wherein the public warning system notification indicates an upcoming public warning system message or that there is no upcoming public warning system message; and
   initiating a mitigation action related to a radio link with a network based at least in part on non-reception by the UE of the short message in the monitored reception occasion,
      wherein the non-reception of the short message in the monitored reception occasion indicates one or more problems associated with radio link, the one or more problems including a presence of an unauthorized device on the radio link, and
      wherein the mitigation action includes reporting, to one or more servers on the network, the non-reception of the short message in the monitored reception occasion.

2. The method of claim 1, wherein the one or more problems include poor performance for the radio link.

3. The method of claim 1, wherein the mitigation action includes modifying one or more communication parameters to access the network using a different cell, a different frequency, a different band, or a different radio access technology.

4. The method of claim 1, wherein the short message is scheduled to be transmitted to a group that includes multiple UEs in the monitored reception occasion.

5. The method of claim 1, further comprising:
   receiving, from the network, information indicating a periodicity associated with the monitored reception occasion, wherein the monitored reception occasion is monitored for the short message according to the periodicity while the UE is in an idle or inactive state.

6. The method of claim 1, further comprising:
   identifying the reception occasion to be monitored for the short message while in an idle or inactive state based at least in part on an identity associated with the UE.

7. The method of claim 1, further comprising:
   receiving, from the network, information identifying multiple reception occasions in which the short message is scheduled to be transmitted; and
   selecting one of the multiple reception occasions that is closest in time to a paging occasion associated with the UE as the reception occasion to be monitored for the short message while the UE is in an idle or inactive state.

8. The method of claim 1, further comprising:
   receiving, from the network, information identifying multiple reception occasions in which the short message is scheduled to be transmitted; and
   selecting any one of the multiple reception occasions as the reception occasion to be monitored for the short message while the UE is in a connected state.

9. The method of claim 1, further comprising:
   receiving another short message during another monitored reception occasion; and
   performing an integrity check on the other short message using one or more security keys, wherein another mitigation action is initiated based at least in part on the other short message failing to pass the integrity check.

10. A method of wireless communication performed by a network entity, comprising:
    scheduling a short message to be transmitted in a reception occasion;
    transmitting the short message in the reception occasion,
       wherein the short message includes a system information change notification or a public warning system notification to be used by a user equipment (UE) to assess a status of a radio link with the network entity,
       wherein the system information change notification indicates an upcoming system information change or that there is no upcoming system information change, and
       wherein the public warning system notification indicates an upcoming public warning system message or that there is no upcoming public warning system message;
    receiving a report indicating a non-reception of the short message in the reception occasion,
       wherein the non-reception of the short message in the reception occasion indicates one or more problems associated with radio link, the one or more problems including a presence of an unauthorized device on the radio link; and
    initiating a mitigation action related to the radio link based on receiving the report.

11. The method of claim 10, wherein the one or more problems include poor performance for the radio link.

12. The method of claim 10, wherein the short message is scheduled to be transmitted to a group that includes multiple UEs in the reception occasion.

13. The method of claim 10, further comprising:
    determining a periodicity associated with the reception occasion based at least in part on a latency requirement associated with the short message; and
    transmitting, to the UE, information indicating the periodicity associated with the reception occasion to be monitored while the UE is in an idle or inactive state.

14. The method of claim 10, further comprising:
    identifying the reception occasion in which to schedule the short message based at least in part on an identity associated with the UE while in an idle or inactive state.

15. The method of claim 10, further comprising:
    transmitting, to the UE, information identifying multiple reception occasions in which the short message is scheduled to be transmitted; and
    transmitting, to the UE, information permitting the UE to select one of the multiple reception occasions that is closest in time to a paging occasion associated with the UE as the reception occasion to be monitored for the short message while the UE is in an idle or inactive state.

16. The method of claim 10, further comprising:
    transmitting, to the UE, information identifying multiple reception occasions in which the short message is scheduled to be transmitted; and transmitting, to the UE, information permitting the UE to select any one of the multiple reception occasions as the reception occasion to be monitored for the short message while the UE is in a connected state.

17. The method of claim 10, wherein the report indicates a failure of the short message to pass an integrity check.

18. The method of claim 17, wherein the mitigation action includes causing the UE to be handed over to one or more of a different cell, a different frequency, a different band, or a different radio access technology.

19. The method of claim 17, wherein the mitigation action includes changing one or more communication parameters to cause the UE to deprioritize selection or reselection of a cell used to transmit the short message.

20. A user equipment (UE) for wireless communication, comprising:
a memory; and
one or more processors coupled to the memory, the one or more processors configured to:
monitor a reception occasion for a short message that includes a system information change notification or a public warning system notification,
wherein the system information change notification indicates an upcoming system information change or that there is no upcoming system information change, and
wherein the public warning system notification indicates an upcoming public warning system message or that there is no upcoming public warning system message; and
initiate a mitigation action related to a radio link with a network based at least in part on non-reception by the UE of the short message in the monitored reception occasion,
wherein the non-reception of the short message in the monitored reception occasion indicates one or more problems associated with radio link, the one or more problems including a presence of an unauthorized device on the radio link, and
wherein the mitigation action includes reporting, to one or more servers on the network, the non-reception of the short message in the monitored reception occasion.

21. The UE of claim 20, wherein the one or more processors are further configured to:
identify the reception occasion to be monitored for the short message while in an idle or inactive state based at least in part on an identity associated with the UE.

22. The UE of claim 20, wherein the one or more processors are further configured to:
receive, from the network, information identifying multiple reception occasions in which the short message is scheduled to be transmitted; and
select one of the multiple reception occasions that is closest in time to a paging occasion associated with the UE as the reception occasion to be monitored for the short message while the UE is in an idle or inactive state.

23. The UE of claim 20, wherein the one or more processors are further configured to:
receive, from the network, information identifying multiple reception occasions in which the short message is scheduled to be transmitted; and
select any one of the multiple reception occasions as the reception occasion to be monitored for the short message while the UE is in a connected state.

24. The UE of claim 20, wherein the one or more processors are further configured to:
receive another short message during another monitored reception occasion; and
perform an integrity check on the other short message using one or more security keys, wherein another mitigation action is initiated based at least in part on the other short message failing to pass the integrity check.

25. A network entity for wireless communication, comprising:
a memory; and
one or more processors coupled to the memory, the one or more processors configured to:
schedule a short message to be transmitted in a reception occasion;
transmit the short message in the reception occasion,
wherein the short message includes a system information change notification or a public warning system notification to be used by a user equipment (UE) to assess a status of a radio link with the network entity,
wherein the system information change notification indicates an upcoming system information change or that there is no upcoming system information change, and
wherein the public warning system notification indicates an upcoming public warning system message or that there is no upcoming public warning system message;
receive a report indicating a non-reception of the short message in the reception occasion,
wherein the non-reception of the short message in the reception occasion indicates one or more problems associated with radio link, the one or more problems including a presence of an unauthorized device on the radio link; and
initiate a mitigation action related to the radio link based on receiving the report.

26. The network entity of claim 25, wherein the one or more processors are further configured to:
identify the reception occasion in which to schedule the short message based at least in part on an identity associated with the UE while in an idle or inactive state.

27. The network entity of claim 25, wherein the one or more processors are further configured to:
transmit, to the UE, information identifying multiple reception occasions in which the short message is scheduled to be transmitted; and
transmit, to the UE, information permitting the UE to select one of the multiple reception occasions that is closest in time to a paging occasion associated with the UE as the reception occasion to be monitored for the short message while the UE is in an idle or inactive state.

28. The network entity of claim 25, wherein the one or more processors are further configured to:
transmit, to the UE, information identifying multiple reception occasions in which the short message is scheduled to be transmitted; and
transmit, to the UE, information permitting the UE to select any one of the multiple reception occasions as the reception occasion to be monitored for the short message while the UE is in a connected state.

29. The network entity of claim 25, wherein the report indicates a failure of the short message to pass an integrity check.

30. The UE of claim 20, wherein the one or more problems include poor performance for the radio link.

* * * * *